Aug. 3, 1965   P. H. HUNTER   3,198,375
BLOW MOLDED CONTAINER
Filed May 1, 1962

INVENTOR
Paul H. Hunter
BY
ATTORNEY ns # United States Patent Office 3,198,375
Patented Aug. 3, 1965

3,198,375
BLOW MOLDED CONTAINER
Paul H. Hunter, Highland Park, N.J., assignor to Union
Carbide Corporation, a corporation of New York
Filed May 1, 1962, Ser. No. 191,560
8 Claims. (Cl. 220—60)

This invention relates to molded plastic containers and to methods for producing the same. More particularly, the present invention relates to blow molded containers possessed of unique closure means.

It is known that packagers of liquid, powdered, and granular materials, such as milk, fruit juices, cleansing and scouring powders, salts, and the like require that the full cross-sectional area of a container be used for filling. This is necessary for expedition and efficiency of production. It is particularly desirable where the commonly employed auger-fill method is utilized for packaging powders and the like.

Container members employed heretofore for this purpose have normally been entirely metallic or paperboard, or a combination thereof employing paperboard walls with metal or plastic ends, closure means and fittings. The difficulties experienced with these materials have been many. Leakage of fluids from paperboard containers is always a serious problem. The vulnerability of containers of paperboard and/or metals to humidity corrosion has also been well established. Thus, salt-containing packages made of paperboard degenerate and come apart frequently under conditions of high humidity. Cleansing powder containers of metal, e.g. tin plate or the like, or of paperboard or the like with metal end plates are also known to rust quickly and induce staining of sinks, counter tops and like surfaces on which the container is deposited; a source of consistent annoyance to the user. Permeability to moisture is also a significant disadvantage inherent particularly in paperboard and modified paperboard containers.

Accordingly, the present invention involves blow molded plastic containers and the process for producing the same. These containers have positioned thereon at least one frictionally interlocking closure member; said closure member being formed integrally with the remainder of the container in the molding process; and subsequently severed therefrom and introduced into a frictionally interlocking position to effect closure of the end opened by the aforesaid severance after the container is filled with the fluid ingredient or composition, liquid or granular, to be transported and marketed therein. Standard blow molding techniques may be employed to effect the novel containers of this invention. The subsequent severance of the end member therefrom with a cutting blade or other means and redeposition thereof in frictional locked engagement as, for example, by means of a slip-fit, snap-on or screw type relationship, with the body of the plastic container after introduction of the compositon to be transported and/or marketed, is accomplished preferably in a continuous assembly; although single containers may be processed individually as well by standard procedures. Fabrication of the container body and closure means in a single blow molding operation is significantly facile and economic. The all plastic product containers offer the important advantages of non-corrodibility combined with substantial moisture impermeability and inhibition and prevention of leakage of fluids and passage of vapors therefrom.

Moisture impermeability is, of course, essential to the satisfactory packaging and storing of many materials. Thus, salt and other powdered or granular hygroscopic and crytsalline materials and the like tend to cake up with the absorption of moisture. Too, the outward permeation of evaporative moisture is undesirable, and substantially obviated in like manner by the present invention. Thus, illustratively, many scouring powders now contain a bleach additive, the bleaching power of which is lost with the loss of water by evaporation or otherwise from the hydrated, powdered composition. Obviously, too, a contanner formed wholly or partially of an alloy or metallic construction will corrode in the presence of such products as salt, bleaches and other chemicals. Indeed, oxidation and consequent destruction of the metal parts of containers thus employed is known to occur unless an inner coating of wax or other protective material is used. Wax is also used to reduce evaporative moisture loss and prevent leakage of liquids from paperboard containers and the like and presents an added problem itself by flaking off the interior walls and seams into the packaged composition, thus causing contamination thereof. This is manifested consistently in the common paperboard milk container, by way of illustration. The blow-mold container of the invention is free of these defects while because of its method of manufacture, its production is economically competitive with that of those containers known heretofore. Further, being formed of resilient plastic materials, as described hereinafter, it is not subject to denting and distortion, as so frequently occurs with both conventional metal and cardboard containers.

The present invention is further illustrated, as are other objectives and advantages, inherent therein, by reference to the following detailed description, taken in connection with the accompanying drawings in which like numbers denote like members throughout.

Figure 2:
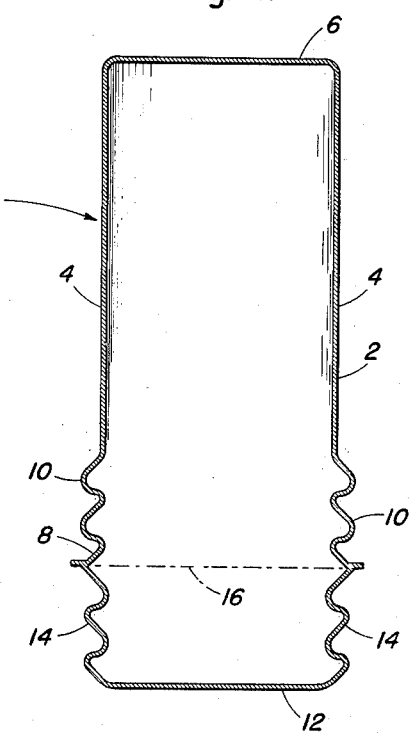
FIGURE 2 illustrates the container of FIGURE 1 in vertical sectional view in which the severed end closure means is in frictional interlocking and substantially airtight connection with the terminal portion of the previously integral end of the main body of the container of FIGURE 1.

Referring now in more detail to the drawings, it will be seen that the embodiment illustrated therein constitutes a blow-molded container 1 closed at both ends as it is formed in a standard blow molding process. The container 1 is seen to be modified to provide the container body 2 composed of the side walls 4, the standard closed end 6, and the modified neck 8 containing the beads or ribs 10 and cap or modified end closure means 12. The cap 12 possesses the ribs 14 disposed about its periphery and is adapted to interlock with the ribs 10 of the neck 8 after severance of the cap or closure means 12 from the neck 8 of the main body 2 of the container 1, at the point indicated by the broken line designated 16 in FIGURE 1. As illustrated in FIGURE 2, after severance of the cap 12 from the container body 2 by means of a suitable cutting edge, the container body 2 is filled with the composition to be transported therein, and the cap 12 inverted and pressed into interlocking assembly with the main container body 2. The cap thus applied is not normally adapted for subsequent removal. If desired, however, the beading of the neck 8 and cap 12 may be so constructed of screw-like threads so that the cap may be screwed on or off at will. It will be evident, as noted above, that filling of the container 1 by the method of the invention through the orifice provided by severance of the cap 12 portion therefrom is particularly convenient and expeditious.

Figure 3:
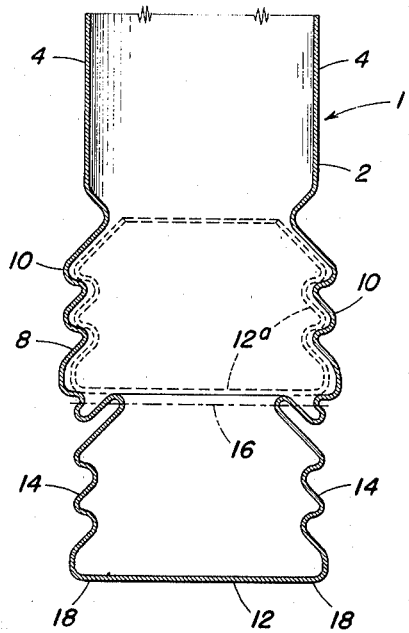
FIGURE 3 shows a portion of a container in vertical sectional view embodying a further modification of the container body and end closure means of the invention.

FIGURE 3 illustrates a modification of the invention wherein the cap 12 is shown first in integral association with the container body 2 and in interlocking engagement, as designated by the broken line representation 12a, after severance of the cap 12 from the main container body 2 at the point designated by the numeral 16. It will be evident that in this modification the cap is not inverted before insertion into the neck 8 of the container body 2, but may be pressed or screwed directly from its positional orientation with relation to the container body 2 directly into the container neck 8.

The modified closure means 12, main container body 2, or both, in the various modifications of the invention are of course withdrawn normally from direct physical contact with each other after severance of the cap 12 from the container body 2 to permit insertion into the container body of the marketable ingredient prior to closure of the container with the cap member 12.

As indicated above, the closure means 12 of the invention may be adapted to constitute a screw cap which is readily removable from the container neck 8, if desired. The closure means 12 of the invention is most frequently utilized at the bottom of the container body 2. It will be evident that suitable pouring means, as, for example, a standard snap-on, flat powder sifting top or the like may be readily employed in the top of such a container to provide a convenient means for removal of the fluid ingredients packaged in the container. It will be evident also that both ends of the container body 2 may be provided with end closure means 12 of the class described.

Figure 1:
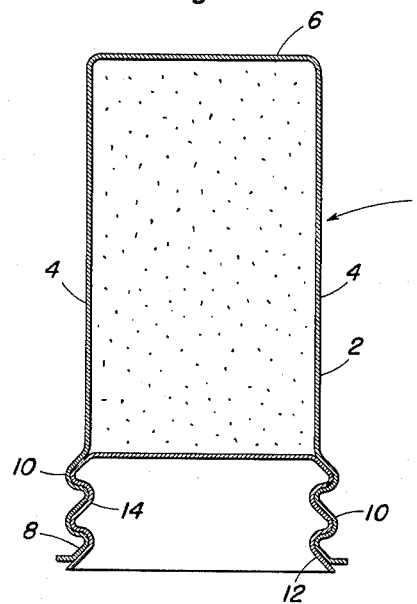
FIGURE 1 is a vertical sectional representation illustrating a blow-molded container of the invention as it is formed in integral condition.

The closure cap means of the kind described in FIGURES 1 to 2 inclusive will provide, if desired, a container having, for example, a recessed bottom. The ribbed construction of the container neck 8 and cap 12 provide a substantially air-tight and liquid-proof seal, in the interlocked state. The number and construction of the ribs 10 and 14 distributed circumferentially about the neck 8 and cap 12, respectively, or otherwise disposed thereon, may be varied within a substantial range, a minimum of preferably from two to four such beads or rib elements being normally preferred. Where particularly heavy contents or large containers are being considered, a greater number of ribs will, of course, be desirable to assure a good lock joint. The number of ribs is also dependent on the density of the plastic employed.

While as seen in the accompanying drawings, the maximum diameter of the ribbed neck 8 of the container is of a greater diameter than that of the remainder of the container body 2, it will be evident that this may be varied and the maximum diameter of the neck 8 may thus be of equal or lesser diameter than the remainder of the container body 2. It will be apparent as well that while the cap closure means 12 is shown positioned with its side walls inserted interior to the side walls of the ribbed neck 8 in the interlocked assembly of the finished article, the ribbed side wall construction 14 of the cap 12 may be disposed with equal facility exterior to the ribbed neck 8. In either event, the insert member or cap 12, properly designed as described herein can be introduced onto or into the container body 2 with substantial ease; and is sufficient, as indicated above, to prevent leakage of liquid, powder or granular contents from the finished container. The interlocking effected, whether by direct pressure or screwing, is, in fact, substantially air-tight. If desired, the interlocking assembly of cap and container body may be further reinforced by a heat or adhesive seal but is not essential. The buttress shaped beads or rib members 10 and 14 are constructed and oriented as seen in the drawings to provide for easy application of the cap 12 while providing substantial resistance to withdrawal of the cap from the main container body 2.

While the container is often of rounded configuration in cross-section, it will be evident that it may also be of square, oval, rectangular or like conformation. Indeed, the cross-sectional diameter of the container 1 need not be uniform along its length; it being capable of modification inwardly, outwardly, or from one conformation to another to provide for greater ease in handling. Plastic containers of the construction here involved are ordinarily more readily and securely gripped manually, in any event, due to the resiliency of the plastic side walls and the beaded construction of the neck and cap elements; which beaded conformation can, of course, be continued the length of the container, if desired. This convenience of handling is not feasible, of course, with containers, such as the wound cardboard containers, known heretofore, whose side walls are normally smooth, hard and cylindrical.

It is noted that other modifications are also feasible and within the compass of the present invention. Thus, the beaded closure means 12 may be so constructed that side walls of a container are disposed about the periphery thereof, also. These side walls are positioned on the opposed surface of the closure member 12 from that on which the ribbed construction 14 is had. The disposal of these additional container side walls is indicated, for example, in FIGURE 3 by the numerical designation 18. Thus, the locking assembly will occur, in effect, in this modification at a point intermediate to the opposite ends of the container.

A further modification envisions a closure means of the invention such as that shown, for example, in FIGURE 3, wherein the closure means 12 is used as the top of the container; and a severable screw cap and complementary neck element of reduced diameter are blow molded in the end closure means 12 itself, or optionally, at the opposite end of the container, to provide for pouring of the fluid contents therefrom as desired.

The production of the containers of the invention such as the integral container 1 of FIGURE 1 of the drawings may be accomplished by any of a variety of standard blow-molding techniques. Thus, a hot plastic tube blank may be gravitationally dropped or extruded into a mold assembly composed of two mold halves each half having a cavity complementary to that of the other mold half; the two mold halves thus providing a mold cavity shaped to conform with the configuration and dimensions of the molded container of the drawings, for example.

Prior to introduction of the plastic tube blank into the mold, the mold halves will be parted to provide for transport of the tube blank from the site of its formation by tubular extrusion, into stable position in the lower mold half. Thereupon the mold halves are moved together and a hollow needle positioned in the upper mold half, for example, will penetrate the hot plastic mold blank and air will be introduced into the tube blank through said needle to blow and expand the blank into a shape conforming to the dimensions of the interior walls of the mold cavity and corresponding to the mold definition seen, illustratively, in FIGURE 1.

Normally, the molds will be cooled to permit the blown integral container and closure means to become rigid prior to parting of the mold halves or elements and removal of the integral container therefrom. The molds may be water-jacketed for this purpose if desired. The closure means 12 may be severed from the main body of the container 2 after cooling and prior to or after removal of the molded container 1 from the mold by any convenient means, such as, for example, a cutter blade or die arrangement, a hot wire or the like. Either the container or cutting means may be rotated to expedite the procedure. Sawing to effect the desired severance is normally avoided since small particles of the plastic material are usually formed which may result in contamination of the contents to be inserted in the container. Thus, suitable blow-molding techniques for use in the practice of the present invention are described, illustratively, in U.S. Patents 2,810,160 and 2,579,399.

Any normally solid thermoplastic compositions can be employed in the practice of this invention particularly those which are characterized by ease of melt extrusion and applicability to blow molding techniques. Water impermeability, good chemical resistance, as well as resistance to denting and breakage are highly desirable characteristics of the polymers. Illustrative of these are the thermoplastic polyolefins, polyethylene and polypropylene, polystyrene, polyvinyl halides as well as copolymers thereof. Hard, resistant resins of high density polyethylenes are normally preferred. Relatively soft polyethylene of a density of 0.92 will ordinarily require greater beading or ribbing of the interlocking container neck 8 and closure means 12 to assure a substantially fluid-proof relationship therebetween, whereas a high density polyethylene, e.g. one having a density of 0.94 to 0.96, would require minimum ribbing to effect a similar secure interlocked assembly. Other thermoplastic resins having similar or equivalent physical properties can of course be employed in the preparation of blow molded articles of the instant invention.

The advantages of the container and procedure for preparing the same as described herein over containers employed heretofore is illustrated by the following examples wherein blow molded containers of the construction described in FIGURES 1 to 2 and formed of polyethylene having a density of 0.96 are utilized in the packaging of the scouring and a commercial bleaching powder containing chlorine releasing agents in comparison with standard packaging containers filled with the same composition and formed of paperboard side walls and metallic end-closure members. Tests were run at 80° F. and 0 percent relative humidity for six weeks. A sufficient number of containers were tested to permit assaying the contents of each type of container on a weekly basis. The percent of available chlorine from the bleaching agent of the conventional metal and paperboard containers was significantly reduced during the time span provided for static storage by the subject test procedure while the assay of the contents of the plastic blow molded containers showed only a small amount of degradation during the same period of time and under the same prevailing conditions. The results of these tests are indicated in detail in the following table.

TABLE

| Days | 0 | 5 | 7 | 14 | 21 | 35 | 42 |
|---|---|---|---|---|---|---|---|
| Conventional Paperboard and Metal Containers | 0.39 | 0.41 | 0.32 | 0.27 | 0.20 | 0.23 | 0.12 |
| Blow Molded Containers of the Invention | 0.42 | 0.42 | 0.41 | 0.43 | 0.41 | 0.36 | 0.37 |

What is claimed is:

1. A blow molded plastic container comprising an open bottom container body having a beaded neck portion defining the open bottom thereof, said neck portion having a minimum diameter as large as the inner diameter of said container body said container body adapted to be inverted for filling, and non-removable beaded bottom closure means adapted to be snapped into the beaded neck portion of said container body in air-tight, permanent, interlocking frictional assembly therewith; said closure means being formed integral with said container body in the blow molding operation and adapted to be severed therefrom and snapped into the beaded neck portion of said container body.

2. The plastic container of claim 1 wherein the top of said container body is provided with pouring means for removal of ingredients packaged in said plastic container.

3. The plastic container of claim 1 wherein said bottom closure means are inverted after severence from said container body and subsequently snapped into the beaded neck portion of said container body thereby forming a recessed bottom in said plastic container.

4. The plastic container of claim 1 wherein the beaded neck portion of said container body is provided with from two to four beads and said beaded closure means are provided with a complementary number of beads.

5. The plastic container of claim 1 wherein the beaded neck portion of said container body is provided with buttress shaped beads constructed and oriented to provide for easy application of said bottom closure means while providing substantial resistance to withdrawal of said bottom closure means from said container body.

6. A blow molded plastic container comprising an open bottom and open top container body having beaded neck portions defining the open bottom and open top thereof, said neck portion defining the open bottom having a minimum diameter as large as the inner diameter of said container body non-removable beaded bottom closure means adapted to be snapped into the beaded neck portion defining the open bottom of said container body in airtight, permanent, interlocking frictional assembly therewith, and beaded top closure means adapted to be positioned in the beaded neck portion defining the open top of said container body in air-tight, interlocking frictional assembly therewith; said bottom and top closure means being formed integral with said container body in the blow molding operation and adapted to be severed therefrom and applied to the beaded neck portions of said container body.

7. The plastic container of claim 6 wherein said top closure means are provided with pouring means for removal of ingredients packaged in said plastic container.

8. The plastic container of claim 6 wherein said top closure means are adapted to be screwed into interlocking frictional assembly with said container body.

References Cited by the Examiner

UNITED STATES PATENTS

| 1,080,747 | 12/13 | Buckley | 220—27 |
| 1,081,555 | 12/13 | Russell | 220—27 |
| 2,717,619 | 9/55 | Whitman | 150—0.5 |
| 2,752,971 | 7/56 | Tupper | 150—0.5 |
| 3,032,823 | 5/62 | Sherman | 18—55 |
| 3,084,395 | 4/63 | Thielfoldt | 18—55 |
| 3,118,562 | 1/64 | Whitney | 220—60 |

FOREIGN PATENTS

| 1,142,720 | 4/57 | France. |

THERON E. CONDON, Primary Examiner.

EARLE J. DRUMMOND, GEORGE O. RALSTON, Examiners.